United States Patent Office 3,361,737
Patented Jan. 2, 1968

3,361,737
3'-DESDIMETHYLAMINO-Δ³',⁴'-ERYTHRO-
MYCIN DERIVATIVES
Peter Hadley Jones, Lake Forest, Ill., assignor to Abbott
Laboratories, North Chicago, Ill., a corporation of
Illinois
No Drawing. Filed Apr. 13, 1966, Ser. No. 542,219
6 Claims. (Cl. 260—210)

The present invention is directed to new erythromycin derivatives and a process for their preparation. More specifically, the new erythromycin derivatives to which this invention is directed are the 3'-desdimethylamino-Δ³',⁴'-erythromycins A and B. The two new compounds differ from one another at the 12-position: the B compound carries a methyl and a hydrogen while the A compound carries a methyl and a hydroxy group at that position.

The new compounds of this invention are active for combating schistomiasis infections: warm-blooded animals heavily infected with schistosoms and actively passing schistosom eggs show marked reduction in worm counts after being treated for 5 consecutive days with intraperitoneal injections of 100 mg./kg. each day, the active compounds being suspended at a concentration of 2% in an 0.3% tragacanth solution.

The new compounds are prepared by heating erythromycin A (or B)-N-oxide under vacuum for a period of at least 30 minutes to a temperature of between 150–190° C.

The pyrolysis of the present process should be carried out for a period of at least 30 minutes and can be extended for several days without undue effect. Temperatures of below 150° C. may require prolonged pyrolysis periods while no advantage is seen in using temperatures above 190° C. The vacuum needed to get good results in the pyrolysis reaction may be selected within a relatively wide range. Best results are obtained at pressures below about 10 mm. Hg-pressure, but pressures of as high as 50 mm. Hg may be used, particularly in conjunction with the upper temperatures specified.

To better understand the process of the present invention, reference is made to the following illustrations.

*Example 1.—3'-desdimethylamino-Δ³',⁴'-erythromycin A*

54.5 g. of erythromycin A-N-oxide (described by Flynn in J.A.C.S., 76, 3126 of 1954) was pyrolyzed at 165–170° C. at a vacuum of 0.2 mm. of Hg for 4 hours. The content of the flask is subsequently dissolved in methanol, treated with charcoal, filtered, and recrystallized from chloroform-ether. The new compound is obtained in a yield of 24.4 g. and melts at 218–219° C. Purity of the compound was established by thin-layer chromatography and the correct structure was determined by an infrared spectrum, the nuclear magnetic resonance spectrum, and by chemical degradation to known compounds.

*Example 2.—3'-desdimethylamino-Δ³',⁴'-erythromycin B*

10 g. of erythromycin B-N-oxide (described by Wiley et al. in J.A.C.S., 79, 6070 of 1957) was heated at 165° C. under an Hg-pressure of 0.5 mm. for 3 hours. The tan glass obtained was dissolved in 200 ml. of methanol and treated with charcoal. After filtration and removal of the methanol, 8.5 g. of a slightly tan glass was obtained. Crystallization from acetone-hexane produced the pure compound melting at 187–190° C. Its purity and structure were characterized like in the corresponding compound of Example 1.

Others may practice the invention in any of the numerous ways which will be suggested to one skilled in the art by the present disclosure. All such practice of the invention is considered a part hereof provided it falls within the scope of the appended claims.

I claim:
1. The erythromycin derivative of formula

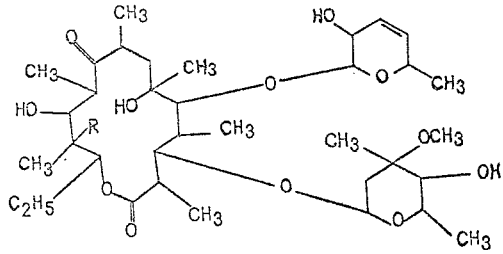

wherein R is hydrogen or hydroxy.

2. The compound of claim 1 wherein R is hydroxy.
3. The compound of claim 1 wherein R is hydrogen.
4. The process of preparing a compound selected from the group consisting of 3'-desdimethylamino-Δ³',⁴'-erythromycin B and 3'-desdimethylamino-Δ³',⁴'-erythromycin A consisting in heating an erythromycin derivative selected from the group consisting of erythromycin B-N-oxide and erythromycin A-N-oxide under vacuum to a temperature of between 150–190° C. for a period of at least 30 minutes.
5. The process of claim 4 wherein said erythromycin derivative is erythromycin A-N-oxide.
6. The process of claim 4 wherein said erythromycin derivative is erythromycin B-N-oxide.

References Cited

Rose: "Analytical Chemistry," vol. 26, May 1954, pp. 938–939.

ELBERT L. ROBERTS, *Primary Examiner.*

J. R. BROWN, *Assistant Examiner.*